Nov. 22, 1966 A. R. GELLER 3,287,546

PARITY PREDICTION APPARATUS FOR USE WITH A BINARY ADDER

Filed Feb. 27, 1963 3 Sheets-Sheet 1

INVENTOR
ALAN R. GELLER
BY Gunter A. Hauptman
ATTORNEY

PARITY PREDICTION APPARATUS FOR USE WITH A BINARY ADDER

Filed Feb. 27, 1963 3 Sheets-Sheet 3

United States Patent Office 3,287,546

Patented Nov. 22, 1966

3,287,546

PARITY PREDICTION APPARATUS FOR USE WITH A BINARY ADDER

Alan R. Geller, Poughkeepsie, N.Y., assignor to International Business Machines Corporation, New York, N.Y., a corporation of New York Filed Feb. 27, 1963, Ser. No. 261,351

13 Claims. (Cl. 235—153)

This invention relates to electronic apparatus. More particularly, this invention relates to the generation of signals usable for detecting errors during digital data processing.

In digital electronic data processing systems, information is represented as bi-valued signals, a first signal value being called a "1-bit" and a second signal value being called a "0-bit." Numeric data may be expressed by groups of bit-representative signals, each signal being given a significance, or weight, in accordance with its relative position in its particular group. Using the binary numeric system as an example, the sequence of 1-bits or 0-bits: 110110 has a decimal value of 54, the assignment of weights being: 32, 16, 8, 4, 2, 1.

The accuracy of any group of bi-valued signals (hereinafter called "binary" information or data) can be determined by maintaining an odd (or if desired an even) number of 1-bits. In other words, if the sum of 1-bits is not odd (or even) the binary data is erroneous. Note: If the number (sum) of 1-bits in a group is not divisible by two, that group contains an odd number of 1-bits. It is common practice to maintain oddness (or evenness) by setting aside one position in each binary data group as an adjustable "parity-bit" or "check-bit." Thus, the number 54 is written as the binary number 1110110; a 1-bit in the leftmost parity-bit position giving it an odd number of 1-bits.

Parity bits are used to check most operations involving binary data, including transfers, modifications and other manipulations. For example, two parity-checked binary data operands may represent an augend and an addend, respectively. In some manner, a parity-bit for the sum of the augend and addend must be computed.

One prior art technique for generating the parity-bit of the result of processing one or more operands is to examine the number of 1-bits in the result and then adjust the result parity-bit in accordance with the desired parity (odd or even). This technique has two important disadvantages: First, it cannot check the accuracy of the operand-processing since the parity-bit is a function of only the result; and second, it is very slow, since the parity-bit cannot be generated until the result is available.

Other prior art techniques obtain checking accuracy and speed by "predicting" the parity-bit that should be used with a correct result. The predicted parity bit may then be used for checking the sum accuracy by well known parity-check circuits. Various parity prediction devices exist. For example, a parity bit for the sum of two operands may be derived as a function of the carries between orders occurring during an addition operation. This has the advantage of giving a parity which is not completely dependent upon the sum and which is computed simultaneously with part of the addition operation. Other prior art apparatus predicts if the parity of a single operand will change as a result of the addition of subtraction of one. In the special case of such single-operand counters, it has been possible to design circuits which predict parity changes simultaneously with "operand processing."

Reference is made to the following patents and applications illustrating the present state of the art over which subject invention constitutes an improvement: U.S. Patent No. 2,884,625, B. W. Kippenham, "Code Generator," issued April 28, 1959; U.S. Patent No. 3,011,073, J. J. Moyer, "Parity Check Switching Circuit," issued November 28, 1961; U. S. Patent No. 3,042,304, E. T. Hall, "Adder Circuit," issued July 3, 1963; U.S. Patent No. 3,046,523, J. V. Batley, "Counter Checking Circuit," issued July 24, 1962, and U.S. Patent No. 3,141,962, F. E. Sakalay, "Parity Predicting Circuit," issued July 7, 1964 (which is a division of application Serial No. 129,687 filed August 7, 1961, F. E. Sakalay, "Special-Function Data Processing"), all assigned to the International Business Machines Corporation.

An object of this invention is to provide apparatus for predicting the parity of a result obtained by processing plural operands independently of, and simultaneously with, said result.

Another object is to predict a parity bit for the sum of plural multi-order operands at the same time that the sum is computed.

An additional object of this invention is to efficiently utilize information from a fast binary adder to generate a check-bit for use with the output of the adder.

Still another object is to provide a parity predictor, for use with a multi-level, carry-predict, parallel, binary adder, which calculates sum parity checks during operation of said adder.

A further object is to generate a tentative parity based upon an addend and an augend and a modification signal for adjusting the tentative parity to final parity in accordance with the value of an input carry.

The foregoing and other objects, features and advantages of the invention will be apparent from the following more particular description of the preferred embodiments of the invention, as illustrated in the accompanying drawings.

These objects are achieved in the apparatus of this invention by means of multi-level parity-prediction circuits in association with a multi-level adder. Operands supplied to the adder are also supplied to the parity-predictor, as is a low-order input carry. The adder and the predictor perform their functions simultaneously and independently. In effect, the predictor supplies a tentative parity which is adjusted in accordance with the input carry to form the final sum parity. Thus the parity-bit is independent of the sum and is developed during the time required to perform the addition.

Figure 1:
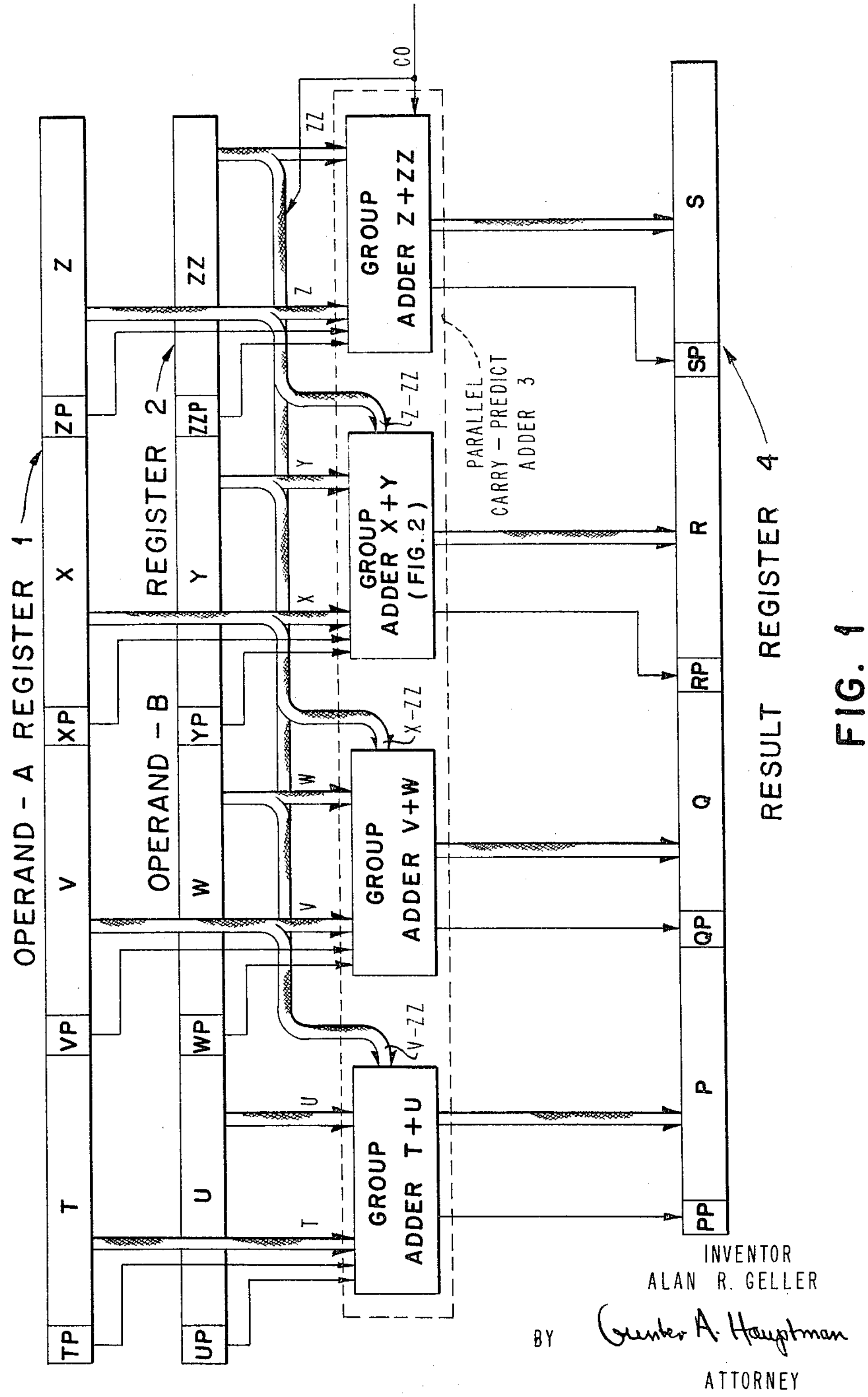
FIGURE 1 is a block diagram showing a multi-group, parallel, carry-predict, binary adder.

Referring to FIGURE 1, an illustrative four-group adder 3, each group of which comprises four data bits plus a parity bit, is shown. The optimum number of groups and the size of each group is not important to explanation of the invention. The adder 3 forms a 16-bit binary sum comprising groups P, Q, R and S in a result register 4 as a function of a binary operand A comprising groups T, V, X and Z in register 1, a binary operand B comprising groups U, W, Y and ZZ in register 2 and an externally supplied input carry C0. Associated with each operand and result group is a parity bit which maintains the sum of 1-bits in the associated group odd, or even, as desired. Corresponding groups of the operands A and B and their associated parity bits in registers 1 and 2 are sent through corresponding groups of the adder 3 to form corresponding sum groups and parity bits in the result register 4. For example, during addition of operands A and B, groups X and Y and parity bits XP and YY are processed in group adder $X+Y$ to form group sum R and parity RP in result register 4. All groups are simultaneously added and all parities are simultaneously formed for entry into the result register 4. The group sum emerging from any one of the group adders is a function of the two operand groups supplied to that group adder, and a carry, if any, from the previous group. Cables V–ZZ, X–ZZ and Z–ZZ and line C0 provide information used by each group to decide whether or not there will be a "group input carry" resulting from operations in previous groups. For example, the group sum Q in result register 4 is a function of group V of operand A in register 1, group W of operand B in register 2 and a group input carry (called C2) derived from information on cable X–ZZ which is connected to all preceding groups X, Y, Z and ZZ and external carry C0. As another illustration, the group sum S is formed by group adder $Z+ZZ$ as a function of group Z, group ZZ and externally obtained group input carry C0.

An explanation of the binary, carry-predict adder principle is given in an article entitled "A One-Microsecond Adder Using One-Megacycle Circuitry" by A. Weinberger and J. L. Smith published in the IRE Transactions on Electronic Computers, volume EC–5, June 1956, pp. 65–73. Descriptions of binary carry-predict adders usable with the invention described herein may be found in U.S. Patent No. 3,078,039, "Error Checking System for a Parallel Adder" of S. F. Anderson, assigned to the International Business Machines Corporation, and in an article entitled "High-Speed Arithmetic in Binary Computers" by O. L. MacSorley published in the Proceedings of the IRE, volume 49, January 1961, pp. 67–91. In view of the detailed descriptions of carry-predict adders in the cited references, and elsewhere, further description of the adder used with the invention is not believed to be necessary.

Still referring to FIGURE 1, errors may be detected by assigning a parity bit position to each four bit group of each operand and the result. For example in operand A, group X has assigned to it parity bit XP, and in operand B, group Y has assigned to it parity YP. Since each group of the sum stored in the result register 4 is a function of two groups in the operands stored in registers 1 and 2, each parity bit in the result register 4 corresponds to one parity bit in each of the two corresponding groups of the operands. Thus, parity bit RP in the result register 4 corresponds to parity bits XP and YP. Each group in the adder 3 will form a parity bit for one group in the result register 4 as a function of the two corresponding operand parity bits and additional information available to the group adder.

Figure 2:
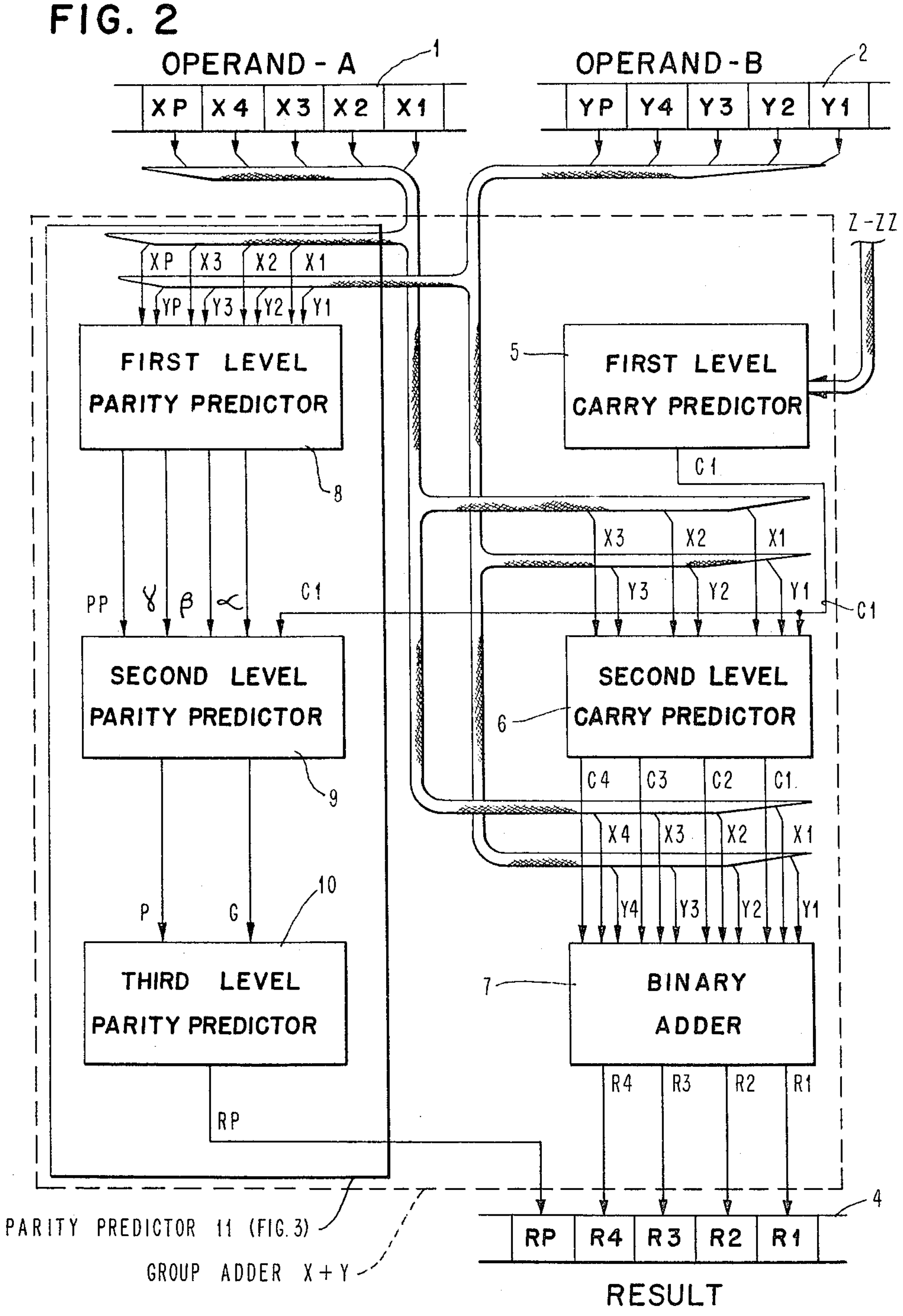
FIGURE 2 is a block diagram showing the carry, parity and addition circuits for a typical one of the groups forming the adder of FIGURE 1.

Referring now to FIGURE 2, typical group $X+Y$ of adder 3 is shown in greater detail. Group X of operand A in register 1 and group Y of operand B in register 2 are combined with information available on cable Z–ZZ from previous groups Z and ZZ and from external line C0 to form group R of the sum in result register 4. Four data bits X4, X3, X2 and X1 of group X and four data bits Y4, Y3, Y2 and Y1 of group Y are used to form four data bits R4, R3, R2 and R1 of group R by means of a first level carry predictor 5, a second level carry predictor 6 and a binary adder 7. Simultaneously, some of the data bits and the parity bits XP and YP are used to arrive at a result parity RP by means of a parity predictor 11 comprising a first level parity predictor 8, second level parity predictor 9 and third level parity predictor 10. Though it is the parity predictor 11 that is the subject of this invention, the binary adder 7 and associated carry prediction circuits will be briefly described.

The binary adder 7 emits binary sum bits R4, R3, R2 and R1 resulting from the addition of an input group carry C1 and two binary numbers comprising bits X4, X3, X2 and X1 and Y4, Y3, Y2 and Y1. In each case, binary weights 8, 4, 2 and 1 are assigned to the binary numbers in the order given. As described in the above cited publications, great speed is obtained in performing the desired addition by generating all carries between binary positions of the adder simultaneously. In an adder divided into groups, this envisions initial simultaneous generation of inter-group carries and subsequent simultaneous generation of intra-group carries between positions. The first level carry predictor 5 generates the group input carry C1 for its group as a function of groups X, Y, Z and ZZ in registers 1 and 2 and the external carry C0. All the first level carry predictors in all the groups operate to supply their respective group carries at the same time. Checking of the accuracy of the predicted group carries, by any of several known techniques, is desirable. For example, the apparatus described in the above referenced U.S. Patent No. 3,078,039 of S. F. Anderson may be used. A second level carry predictor 6 utilizes the predicted group input carry C1 and some of the bits from the groups X and Y of operands A and B to predict intra-group carries C2, C3 and C4 to be supplied to each order of the binary adder 7. Carry C1 supplied to the first order of the binary adder 7 is the same as the group carry C1 predicted by the first level carry predictor 5. The binary adder 7 then supplies to the result register 4 four orders of the sum (bits R4, R3, R2 and R1) as a function of corresponding inter-order carry bits and operand bits. The binary adder 7 is obviously of very simple construction since it need not provide for "rippling" of carries between binary orders. In summary, as soon as the first level carry predictor 5 has supplied the group input carry C1, the second level carry predictor 6 is able to predict inter-order carries to the binary adder 7, which then supplies to the result register 4 the group sum R. All groups perform addition simultaneously.

The parity predictor 11 comprises three levels: The first level parity 8, second level parity predictor 9 and third level parity predictor 10; which correspond to the first level carry predictor 5, second level carry predictor 6 and binary adder 7 respectively. While the first level carry predictor 5 generates the group input carry C1, the first level carry predictor 8 simultaneously generates partial parity information PP, $\alpha$, $\beta$ and $\gamma$ as a function of bits X3, X2 and X1 of group X and bits Y3, Y2 and Y1 of group Y. When the group input carry C1 is available, from the first level carry predictor 5, the second level parity predictor 9 supplies second partial parity signals P and G as a function of the group input carry C1 and the first partial parity information PP, $\alpha$, $\beta$ and $\gamma$. The second partial parity information P and G is available at approximately the same time that the second level carry predictor 6, which also uses the group input carry C1, makes the inter-order carries C1, C2, C3 and C4 available to the binary adder 7. As the binary adder 7 performs addition, the third level parity predictor 10 utilizes the second partial parity signals P and G to generate a predicted result parity RP for use with group R of the result. Therefore, at approximately the same time that the binary adder 7 supplies to result register 4 result bits R4, R3, R2 and R1, the third level parity predictor 10 supplies to the same register 4 the parity bit RP. In this way, the parity predictor 11 and the circuits associated with the binary adder 7 cooperate to efficiently arrive at a group sum R and corresponding parity bit RP.

Figure 3:
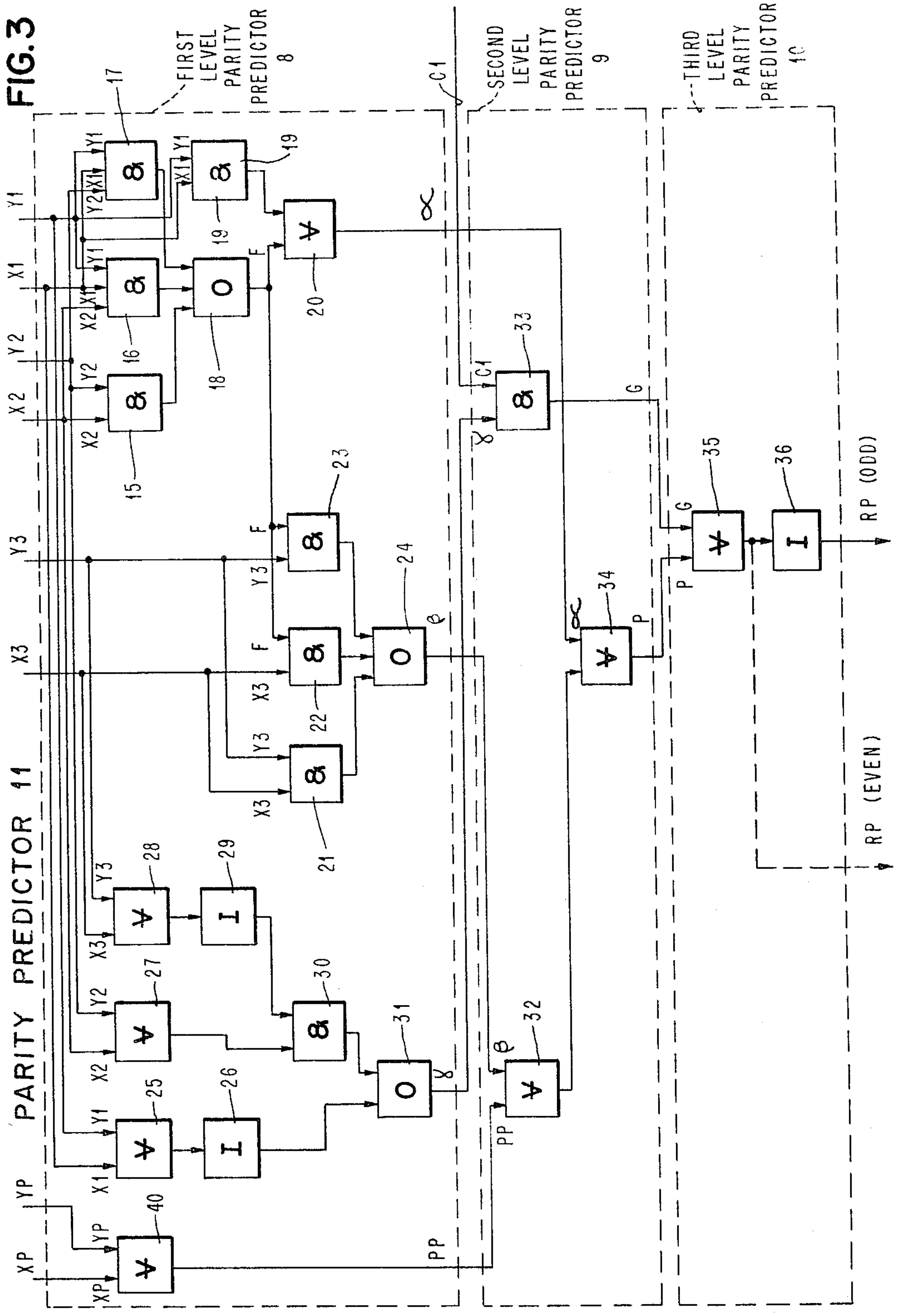
FIGURE 3 is a logic diagram showing the parity circuits of FIGURE 2 in detail.

FIGURE 3 is a logic diagram showing a typical parity predictor 11 is greater detail. Standard symbols are used to identify the logic blocks in the circuit diagram: each AND circuit, designated by the symbol "&," has a 1-bit at its output when 1-bits are present at all its inputs; every OR circuit is identified by the symbol "O," there being a 1-bit at the output whenever at least one 1-bit is present at its inputs; inverters are designated by the letter "I," there being a 1-bit output whenever there is a 0-bit input, and vice versa; and the symbol "∀" indicates an Exclusive OR circuit, the output of which is a 1-bit whenever one input, and not the other, has a 1-bit present.

The first level parity predictor 8 utilizes the parity bits XP and YP and three of the operand bits X3, Y3, X2, Y2, X1 and Y1 from groups X and Y to generate first partial parity signals PP, $\alpha$, $\beta$ and $\gamma$. The relationships of the first partial parities to the inputs are shown by the following equations:

(1) $PP=XP\veebar YP$ (2) $\alpha=X1\cdot Y1\veebar F$ (3) $\beta=X3\cdot Y3+(X3+Y3)F$ (4) $\gamma=\overline{X1\veebar Y1}+(X2\veebar Y2)\overline{(X3\veebar Y3)}$ In Equations 3 and 4, $$F=X2\cdot Y2+(X2+Y2)X1\cdot Y1$$

The AND function is symbolized in the above equations by "·," the OR function by the symbol "+," the inverse (or "complement") of an element is indicated by a line above the element, and the Exclusive OR function is designated by the symbol "$\veebar$."

The second level parity predictor 9 operates upon the first partial parities PP, $\alpha$, $\beta$ and $\gamma$ and upon the group carry input C1, when available, to emit second partial parities P and G in accordance with the following relationships:

(5) $P=PP\veebar\beta\veebar\alpha$ (6) $G=\gamma\cdot C1$

In effect, the signal P represents a tentative parity which is adjusted in accordance with the signal G to reflect the effect that the group input carry has on the final sum parity RP.

The third level parity predictor 10 generates the final parity RP as a function of the second partial parities P and G at the same time that the binary adder 7 resolves the final group R result. The parity RP normally maintains an odd sum of 1-bits in the result register 4 group R; but, may also be chosen to maintain the sum even. The relationships between the second partial parities P and G and the parities RP (odd) and RP (even) are:

(7) $RP\ (\text{odd})=\overline{P\veebar G}$ (8) $RP\ (\text{even})=P\veebar G$

The operation of the invention will now be described, for a typical group, with reference to the figures. It is assumed that odd parity bits are used and that the values of the external carry C0 and the numbers in groups Z and ZZ are such that a 1-bit carry C1 exists. Group X of the operand A in register 1 comprises bits (decimal 11) arranged as follows:

```
  P 4 3 2 1
X 0 1 0 1 1
```

Group Y of the operand B in register 2 contains bits (decimal 9) arranged as follows:

```
  P 4 3 2 1
Y 1 1 0 0 1
```

The left-most bit in each case is the parity bit and the balance of the bits represent binary orders descending in value from right to left. The actual binary value of each one of the bits is dependent upon the position of the group, which is in this case the second lowest groups in the numbers stored in registers 1 and 2. However, for purposes of explanation, the absolute binary significance of the bits may be ignored and their relative values 8, 4, 2 and 1 (reading from left to right) may be used. Therefore, the group input carry C1 has a value of one, while the carry into the next group, if any, has a value of sixteen. Addition of the group input carry C1 and the group X and Y numbers will give the following result:

```
  4 3 2 1
X 1 0 1 1
Y 1 0 0 1
C 0 1 1 1
---------
R 0 1 0 1
```

Inter-order carries (including the group input carry C1) from the second level carry predictor 6 are indicated by the letter "C." There will be a carry (valued sixteen) into the next group, which carry is derived by the first level carry predictor associated with group adder $V+W$. Thus, the sum of 11, 9 and 1 is 5 plus a carry 16. Since the parity bit RP (odd) associated with the result 0101 must be a 1-bit, group R in result register 4 will contain:

```
  P 4 3 2 1
R 1 0 1 0 1
```

Referring to FIGURE 2, during a first time interval the first level carry predictor 5 and the first level parity predictor 8 are operative. The first level carry predictor 5 interrogates groups Z and ZZ in registers 1 and 2 respectively, and external carry C0, generating as a result a 1-bit group carry C1. The first level parity predictor 8 receives inputs from the parity bits and three low order bits XP, X3, X2 and X1 (0, 0, 1, and 1) of group X and YP, Y3, Y2 and Y1 (1, 0, 0 and 1) of group Y generating as a result first partial parities $PP=1$, $\gamma=1$, $\beta=0$ and $\alpha=0$.

Referring to FIGURE 3, of AND circuits 15, 16 and 17 only AND circuit 16 has a 1-bit output, which output is applied to OR circuit 18 to place a 1-bit signal on line F. AND circuit 19, however, having a 1-bit output which is, together with the output F of OR circuit 18, applied to Exclusive OR circuit 20, causes an $\alpha=0$ output from first level parity predictor 8. None of AND circuits 21, 22 and 23 have an output, so that there will be $\beta=0$ output from OR circuit 24. Exclusive OR circuit 25 has a 0-bit output which, being applied to inverter 26, causes a $\gamma=1$ signal to be supplied by OR circuit 31. Exclusive OR circuit 27 receives different inputs from lines X2 and Y2 so that it places a 1-bit on one input of AND circuit 30. Exclusive OR circuit 28 receiving identical signals at its inputs X3 and Y3, sends a 0-bit to inverter 29 which supplies a 1-bit to the other input of AND circuit 30. AND circuit 30 therefore supplies to OR circuit 31 a 1-bit, which constitutes another source of the $\gamma=1$ signal. Exclusive OR circuit 40 supplies a $PP=1$ signal due to opposite inputs on lines XP and YP.

Referring again to FIGURE 2, during a second interval the second level carry predictor 6 and the second level parity predictor 9 may operate, both being dependent upon the group input C1 from the first level carry predictor 5. The second level carry predictor 6 utilizes the group input carry C1 and some of the bits from groups X and Y to generate inter-order carries (0111). The second level parity predictor 9 utilizes the first partial parities $PP=1$, $\gamma=1$, $\beta=0$ and $\alpha=0$ and the input carry $C1=1$, to generate second partial parities $P=1$ and $G=1$. Referring to FIGURE 3, the signal $G=1$ is obtained from AND circuit 33 as a result of the $\gamma=1$ input from the first level parity predictor 8 and the input carry $C1=1$. The signals $PP=1$ and $\beta=0$ are applied to Exclusive OR circuit 32 to supply a 1-bit signal to Exclusive OR circuit 34. Since Exclusive OR circuit 34 also receive an $a=0$ signal, it will emit a $P=1$ output.

Referring to FIGURE 2 again, during a third interval the binary adder 7 and the third level parity predictor 10 are operative to supply final information to group R of the result register 4. The binary adder 7 receives operand group X (1011), operand group Y (1001) and inter-order carries (0111); generating as a result data sum bits (0101) for group R. This result assumes that a carry (having a relative value of 16) is being added to the next pair of groups V and W, this carry having been predicted by the first level carry predictor associated with the adder $V+W$. The third level parity predictor 10 utilizes the second partial parity signals $P=1$ and $G=1$ to generate a parity, $RP\ (\text{odd})=1$, which is the correct parity for use with the group R result (0101). Referring to FIGURE 3 Exclusive OR circuit 35 receives signals $P=1$ and $G=1$ which, being identical, cause a 0-bit to be applied to inverter 36 which supplies an output $RP$ (odd)=1. If an even parity is desired, an output $RP$ (even)=0 may be obtained directly from the output of Exclusive OR circuit 35.

There have been described parity prediction circuits usable with a binary carry-predict adder. Only one group of parity prediction circuits has been described, this group containing circuits typical of those used with other groups. The parity predictor operates simultaneously with the binary adder, steps in the operation of its level corresponding to steps in the operation of the binary adder levels. An advantage of this is that the parity predictor does not have to utilize information supplied by the binary adder until the information is available. Thus, though the adder and the parity predictor operate independently, they will efficiently arrive at their results at approximately the same time.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination:

a source of operand-representative signals;

an operand processor connected to said source for generating result-representative signals as a function of said operand-representative signals and internally generated carry signals;

a parity generator connected to said source for generating, directly as a function of said operand-representative signals, parity-representative signals indicating the parity of said result-representative signals; and, means connected to said operand processor and parity generator for utilizing said result-representative and parity-representative signals.

2. Logic means, including:

a plurality of sources of groups of input signals;

a plurality of first circuits, each circuit connected to a different one of said sources, for deriving corresponding groups of output signals as a function of respective groups of input signals and internally generated carry signals; and a plurality of second circuits, each circuit connected to a different one of said sources, for deriving, as a function of respective groups of input signals, parity signals for use with corresponding ones of said groups of output signals.

3. Electric circuitry, including:

a source of operand signals;

first logic, connected to said source, operable in response to said operand signals to generate, during a first period, an input carry signal;

second logic, connected to said source and to said first logic, operable in response to said operand signals and said input carry signal, to generate, during a second period, binary result signals;

third logic, connected to said source, operable in response to said operand signals to generate, during said first period, partial parity signals;

fourth logic, connected to said first and third logic, operable in response to said partial parity signals and said input carry signal to generate a parity signal synchronous with said result signals; and utilization means, connected to said second and fourth logic, operable to receive said binary result and parity signals.

4. Apparatus for deriving, from three binary operands, a result parity bit to be used with the binary sum of said operands, comprising:

first logic circuits responsive to digital-representative and parity-representative bits of a first and a second of said operands, for generating first partial parity information;

second logic circuits, connected to said first logic circuits, responsive to said first partial parity information and to a third of said operands for generating second partial parity information; and third logic circuits, connected to said second logic circuits, responsive to said second partial parity information for generating said result parity bit substantially in step with the signal represenative of said binary sum.

5. An electronic circuit for predicting a parity bit, to be used with a sum of three operands obtained during a fixed interval, including:

first means operable, during a first portion of said interval, to generate first partial parity information as a function of two of said operands; and second means, connected to said first means, operable during the remainder of said interval, to generate said parity bit in substantial coincidence with the signal representative of said sum as a function of said partial parity and the third operand.

6. A circuit for predicting a parity bit RP for use with a binary sum R4, R3, R2, R1 derived from a binary operand X4, X3, X2, X1 associated with a parity bit XP, a binary operand Y4, Y3, Y2, Y1 associated with a parity bit YP and an input carry C1, comprising:

first logic circuits, for generating as functions of bits of said two operands, first partial parties PP, $\gamma$, $\beta$ and $\alpha$, said functions being defined as follows:

$$PP=XP\veebar YP$$

$$\gamma=\overline{X1\veebar Y1}+(X2\veebar Y2)\cdot\overline{(X3\veebar Y3)}$$

$$\beta=X3\cdot Y3+(X3+Y3)\cdot F$$

$$\alpha=X1\cdot Y1\veebar F$$

where $F=X2\cdot Y2+(X2+Y2)\cdot X1\cdot Y1$;

second logic circuits, connected to said first logic circuits, for generating as functions of said first partial parities and said input carry, second partial parities P and G, said functions being defined as follows:

$$P=PP\veebar\beta\veebar\alpha$$

$$G=\gamma\cdot C1$$

and third logic circuits, connected to said second logic circuits, for generating as a function of said second partial parities, a single odd parity RP (odd), said function being defined as follows:

$$RP\text{ (odd)}=\overline{P\veebar G}$$

7. The circuit of claim 6, wherein said third logic circuits are operable to generate as a function of said second partial parities, a single even parity RP (even), said function being defined as follows:

$$RP\text{ (even)}=P\veebar G$$

8. A parity predictor comprising:

a source of grouped binary operands;

an adder, connected to said source, for deriving during a first time from each group of operands an input carry to another group, deriving during a second time from each group of operands and the input carry to each group of operands binary carries for each group, and deriving during a third time from each group of operands and the binary carries for each group binary sums for each group;

first parity prediction circuits, connected to said source for deriving, during said first time, from each group of operands a number of first partial parities;

second parity prediction circuits, connected to said first parity prediction circuits and to said adder, for deriving during said second time from said first partial parities and from said input carries to each corresponding group a tentative sum parity bit and an adjustment bit for each group;

sum parity circuits, connected to said second parity prediction circuits for adjusting said parity bits during the derivation of said group binary sums in said third period in accordance with said adjustment bits; and utilization means, connected to said adder and to said sum parity circuits for associating each parity bit with the sum for its corresponding group.

9. A parity predictor for generating a parity for the sum of three operands, including:

first prediction circuitry for generating a tentative parity as a function of two of said operands;

second prediction circuitry, connected to said first prediction circuitry, operative while said sum is being generated to modify said tentative parity as a function of a third of said operands; and utilization means, connected to said second prediction circuitry, for combining said tentative parity as modified by said second prediction circuitry with a corresponding sum.

10. The combination of claim 1, wherein said means comprise:

parity checking apparatus, operable to react simultaneously to said parity and result-representative signals to indicate the correctness of said result-representative signals.

11. The parity predictor of claim 8, further including in combination:

parity checking apparatus, connected to said utilization means and responsive to sum and parity bits simultaneously, for indicating the correctness of each sum relative to its associated parity bit.

12. The combination of claim 11, further including:

carry checking apparatus, connected to said adder, operable to check the accuracy of the input carries derived from each group.

13. In combination:

a source of operand-representative signals;

an operand processor connected to said source for generating result-representative signals as a function of arguments represented by said operand-representative signals and internally produced carry signals; and a predicted parity generator connected to said source and said processor for generating, as a function of some, less than all, of said operand-representative signals and some, less than all, of said carry signals, parity-repreesntative signals indicating the parity of said result-representative signals and appearing earlier in time than any like parity indications which could be obtained from any function dependent upon all carry signals.

References Cited by the Examiner

UNITED STATES PATENTS

| | | | |
|---|---|---|---|
| 3,036,770 | 5/1962 | Harrison et al. | 235—153 |
| 3,078,039 | 2/1963 | Anderson | 235—153 |
| 3,083,910 | 4/1963 | Berkin | 235—153 |

MALCOLM A. MORRISON, *Primary Examiner.*

M. P. ALLEN, *Assistant Examiner.*